United States Patent [19]

Côté et al.

[11] Patent Number: 4,575,521

[45] Date of Patent: Mar. 11, 1986

[54] CLOSED CELL PHENOLIC FOAMS

[75] Inventors: Jacynthe Côté, Chateauguay; Sunil K. Vidyarthi, Beaconsfield, both of Canada

[73] Assignee: Exxon Research and Engineering Company, Florham Park, N.J.

[21] Appl. No.: 683,691

[22] Filed: Dec. 19, 1984

[30] Foreign Application Priority Data

Oct. 30, 1984 [CA] Canada .................................. 466623

[51] Int. Cl.$^4$ .............................................. C08J 9/14
[52] U.S. Cl. ..................................... 521/112; 521/117; 521/121; 521/130; 521/131; 521/136; 521/181
[58] Field of Search ............... 521/117, 121, 130, 131, 521/136, 181, 112

[56] References Cited

U.S. PATENT DOCUMENTS

| | | | |
|---|---|---|---|
| 3,389,094 | 6/1968 | D'Alessandro | 521/181 |
| 3,779,959 | 12/1973 | Pinten et al. | 512/181 |
| 4,001,148 | 1/1977 | Simec et al. | 521/181 |
| 4,133,931 | 1/1979 | Beale et al. | 521/181 |
| 4,165,413 | 8/1979 | Sefton | 521/181 |
| 4,219,623 | 8/1980 | Sudan et al. | 521/181 |
| 4,247,413 | 1/1981 | Beale et al. | 521/181 |
| 4,303,758 | 12/1981 | Gusmer | 521/181 |
| 4,353,994 | 10/1982 | Smith | 521/181 |

*Primary Examiner*—Morton Foelak
*Attorney, Agent, or Firm*—Roylance, Abrams, Berdo & Goodman

[57] ABSTRACT

An improved process is disclosed for the preparation of a cured substantially closed cell phenolic resin foam by preparing a mixture of a foamable phenol-aldehyde resin, a blowing agent, and an acid catalyst, allowing the mixture to foam, and curing the phenolic foam, wherein the improvement comprises:

(a) maintaining the water content of the foamable mixture below about 14% by weight,
(b) using a resin-soluble acid catalyst,
(c) adding at least a minimum amount of two parts per hundred resin of surfactant to the mixture prior to foaming, and
(d) adding a member of the lactone family to the mixture prior to foaming.

20 Claims, 3 Drawing Figures

CLOSED CELL PHENOLIC FOAMS

BACKGROUND OF THE INVENTION

This invention relates to improved closed cell phenolic foamed products and more particularly to such foams having substantially no microvoids in the cell walls and high wall strength, and to a process of making such foams.

Phenolic polymers have been known for a long time and there is also a great deal of prior art relating to cellular materials made from these polymers which are more commonly referred to as foamed materials. Such foams are produced by mixing reactants in the presence of a blowing agent which produces the foam which is then cured. Most of the prior art, however, refers to what is known as open cell phenolic foams for which the production is well-known. Also well-known is the use of fluorocarbon blowing agents which are of low thermal conductivity. Most known cellulose materials produced from phenolic polymers are inferior, particularly for insulating products, as they exhibit unsatisfactory thermal conductivity and other properties initially as they are often of too high porosity and also exhibit an undesirable increase in thermal conductivity with time.

More desirable products are known as closed cell phenolic foams which, however, are difficult to manufacture. There has been no formulation as to what makes the difference between a closed cell foam as compared to an open cell foam. With closed cell foams, the initial thermal conductivity is much better than with an open cell foam for obvious reasons but even with these foams, the presence of microvoids in the cell walls increases the rate of diffusion of air into the cell to displace the low thermal conductivity gas therein.

To achieve the maximum benefits from a closed cell foam, that is to retain the low thermal conductivity of the product by preventing air diffusion into the cellular structure, two properties must be maintained. The cell walls must be free of microvoids or microperforations and they must have high strength.

The following discussion relates to some prior art patents dealing with closed cell phenolic foams.

U.S. Pat. No. 4,303,758 of Gusmer deals with closed cell phenol-aldehyde foams and a method of producing them. In the process according to the patent the internal temperature of the foamed material during curing is kept above the boiling point of the blowing agent but less than 100° C. and is sufficiently low to maintain the closed cell structure as the foam is cured. The internal temperature is controlled by using a resole resin of sufficiently low exothermic heat of reaction and using the proper amount of acid catalyst. The resin used is first dehydrated to remove most of the water, that is to less than 10% by weight of water and often much lower down to, for example, 0.2 to 1% by weight. A test is set out for determining the reactivity of the resin to ascertain whether or not it fulfills the requirements. The blowing agent, acid catalyst and surfactants used are conventional and the acid catalyst is used usually in an amount of about 0.5 to 5% by weight. Reaction times of 15 minutes and higher seem to be contemplated from the description of the proportions of acid catalyst suitable for use.

U.S. Pat. No. 3,389,094 of D'Alessandro relates to a closed cell phenolic foam structure of fine cell size. This is obtained by foaming of phenol-formaldehyde resin containing less than 10% water, with a polyhalogenated fluorocarbon. The latter is essential and seems to be the real focus of the patent. It is specified that the cores of the foams are free of interstitial voids or holes. The acid catalysts used are conventional and the amounts are not considered to be critical.

U.S. Pat. No. 4,133,931 of Beale et al deals with a closed cell phenolic foam, in the preparation of which specific surfactants are used. Conventional catalysts are used in an amount generally of 0.5 to 20 weight percent based on the weight of the cellular material. The surfactant is a branched, non-ionic material with a hydroxyl value less than 50 achieved by capping excess hydroxyl groups.

U.S. Pat. No. 4,247,413 also of Beale et al is a divisional application related to the previous patent discussed. It relates of course to a closed cell phenolic foam but here also the use of special surfactants is involved.

U.S. Pat. No. 4,353,994 of Smith deals with a closed cell phenolic foam product but it is prepared by reacting a furfuryl alcohol compound with a benzylic-ether phenol resin. Conventional acid catalysts are used.

U.S. Pat. No. 4,165,413 of Sefton deals with improved phenol-aldehyde foamed condensates but apparently relates to open celled foams. The patent is concerned with obtaining more uniform cell structure by foaming the resin in the presence of N-methyl-2-pyrrolidone. Catalysts and blowing agents are conventional. Although the patent apparently deals with open celled foams, it is specified that the products are substantially free of splits, voids or blow holes and thus have a more uniform cell structures. Apparently this is due to the inclusion of N-methyl-2-pyrrolidone to which the patent is restricted. That material is used in amounts of about 0.25 to about 5.0 parts per 100 parts of resin (PHR).

One disadvantage of the aforementioned prior art is that when the resin is dehydrated down to a low proportion of water the handling of the resin is complicated because of the high viscosity of the remaining material. Another disadvantage in the prior art is long reaction times. As mentioned before, it is also desired to achieve as few voids as possible in the cell walls as this relates to stability of the K (thermal conductivity) value of the resin which of course is a very important feature of an insulating material. In one of the aforementioned patents an additive to the foaming process apparently eliminated most voids but this patent did not give any indication as to how to achieve a foam having a very high percentage of closed cells.

BRIEF SUMMARY OF THE INVENTION

The present invention provides an improved process for obtaining an integral high quality closed cell phenolic foam product of a minimum closed cell content of 75% and generally having 80%, often 85% or greater, closed cells. Also the foams so produced have substantially no perforations or microvoids and high wall strength and thus have a highly improved thermal conductivity stability. Furthermore, the process is optimized to provide as short a foaming and curing time as possible.

Thus, the present invention provides a process which depends on a combination of factors. The combination of factors is control of the water content of the system, that is resin and catalyst, to less than about 14% by weight in the total system. A second feature of the combination is that the system is maintained homogenous by use of a resin soluble catalyst. Next, a minimum amount of surfactant is necessary for proper operation and such surfactant must be efficient in the 0° to 100° C. temperature range. Finally, and most importantly, the foaming is conducted in the presence of butyrolactone or other lactone as additive.

By utilization of this combination of features in the preparation of phenolic foam material, the K stability is drastically improved and also a faster foaming process is possible.

DETAILED DESCRIPTION OF THE INVENTION

Phenol-aldehyde resins that can be used in the process of this invention are generally liquid, water-soluble or water-emulsifiable resole type resins known as A stage resins. These resins are produced by reacting phenol and an aldehyde, preferably formaldehyde, in an equimolar ratio or with excess formaldehyde in an alkaline medium. The resins are soluble in alkalis, alcohols, ketones and to some extent water. The resoles consist mainly of a complex mixture of phenol alcohols with a relatively high hydroxyl content.

Aqueous phenol formaldehyde resins can be produced by reacting phenol and formaldehyde under controlled reaction conditions and with a controlled excess of free formaldehyde. Here, the resin is prepared by reacting the phenol and formaldehyde in certain critical proportions in the presence of a critical proportion of a basic catalyst up to an end point of less than a certain weight percent free phenol. The phenol formaldehyde resins can also be formed in a two stage process wherein the first stage is carried out under novolac forming conditions and the second stage is conducted at resole-forming conditions with a basic catalyst.

As to the phenol or aldehyde used in forming the resole resins, a number of compounds can be used. These can include as phenols, both phenol itself and its homologs such as cresols and xylenols or mixtures thereof. As the aldehyde, this can be constituted by formaldehyde, acetaldehyde, furfural and other aldehydes as well as mixtures thereof. Also aldehyde producing compounds may be used as for example paraformaldehyde, hexamethylenetetramine, methanol, trioxane, tetraoxymethylene and others. These materials, other than phenol and formaldehyde themselves, generally react at a slower rate and therefore the preferred materials for use according to the invention are phenol-resole resins of phenol and formaldehyde.

Generally, the ratio of phenol to formaldehyde in the resole resin is that which is standard in the art and is approximately 1:1.4 up to 1:1.8 but this range is not to be considered as being restrictive as other resole resins can readily be used.

According to the invention, before the resin is mixed with the other ingredients for preparing the foam, water is removed if necessary to meet the general limit on water content by evacuation or vacuum stripping. Conventional phenol formaldehyde resole resins generally contain about 5–20% by weight of water so water removal will not necessarily be required.

At a water content of about 9% the viscosity for the resin will be about 25,000 cps while at about 5% the viscosity will be about 100,000–150,000 cps. For success of the foaming process and for obvious practical reasons, the resin must be capable of being readily handled and processed. To be able to handle viscosities as aforementioned, several possibilities exist. The first is that the resin can be heated but this is limited in applicability and even so the viscosity will not decrease to very low values. Furthermore, this tends to result in stability problems of the resin and may result in processing control difficulties. Another possibility is to use a sophisticated pumping and mixing device to handle the very high viscosity resin but the disadvantage here is the obvious one of high cost of equipment.

Finally, a solvent can be added to reduce the viscosity of the resin. By adding about 10 to 15% of solvent by weight of resin, to a resin of viscosity 100,000–150,000 cps. the viscosity can be decreased to the order of 10,000–20,000 cps and is more readily handled. If considerable water is to be removed from the resin, the solvent can be added first and then water distilled off or the water first removed as already indicated.

Thus in practical terms, according to the invention, the resin can be dissolved in a solvent either before or after removal of the water to the aforementioned level of about 14% or less.

It has been mentioned that the process according to the invention is carried out in the presence of butyrolactone or other lactone as additive. It should be pointed out here that the water content of the system actually can be higher than about 14% by weight provided that increased proportions of lactone are used but this is less preferred because of consequent cost increases. The most practical procedure is to add the lactone to the resin or as part of a solvent system for dissolving the resin or it can be mixed with the catalyst. In fact, the resin could be dissolved in lactone by itself as solvent and additive but this does add to the cost of the materials used.

Preferably however the lactone is mixed with the resin just prior to use as it does affect the shelf-life of the resin. Alternatively the lactone can be mixed with the catalyst instead.

Butyrolactone is, as indicated, not the only material that can be used as additive although it is the most preferred from the point of view of cost, commercial availability, boiling point range and like considerations. Any member of the lactone family is suitable for the purpose. Other examples are 5-valerolactone and bromobutyrolactone.

The butyrolactone or other lactone is to be added to the system in an amount of above 1 phr to 10 phr as a practical measure depending partly on viscosity requirements. This range is not intended to be restrictive but a minimum amount of about 3 phr is usually necessary to achieve the superior results of the phenolic foams prepared according to the invention.

As the other solvent which may be used in admixture with the lactone to dissolve the resin, any aprotic solvent miscible with water and soluble in the resin and which has a boiling point above 100° C. can be used. Examples are polyhydroxy compounds such as ethylene glycol, propylene glycol, and glycerine.

The amount of solvent or mixed solvent that is used to dissolve the resin is of the order of about 5% to 25% by weight but of course this will depend on the solubility of the resin and also on the desired viscosity for handling of the resin and on the water content of the resin. Larger or smaller amounts may be used but with these criteria in mind.

Any acid catalysts which will enhance the crosslinking and foaming reaction can be employed in the process of the present invention provided that the catalyst is resin soluble. Examples are acetic acid, phosphoric acid and the sulphonic acids, particularly the aromatic sulphonic acids such as benzenesulphonic acid, toluenesulphonic acid or xylenesulphonic acid. If acetic or phosphoric acids are used these can be used as such in the absence of water or, as with the other acids mentioned, dissolved in water or in a solvent. The solvent used for such purpose can be the solvents aforementioned for use with the resin. The lactone could be used as the solvent also but this use is not really practical as it adds to the cost of the product. Preferably, the solvent is ethylene glycol however other common solvents such as dimethyl sulfoxide and dimethyl formamide may be used.

The catalyst must be resin-soluble in order to prevent phase separation during the process and maintain a homogenous mixture. The preferred acid catalysts for use are the aromatic sulphonic acids such as toluene or xylene sulphonic acid dissolved in ethylene glycol or dimethyl sulfoxide.

The amount of acid catalyst used will depend on the acidity thereof and the optimum rate of foaming which of course can be determined by one skilled in the art. However, the amount is generally about 3 to 30 phr, preferably 10–15 phr, which is somewhat less than is otherwise required in the absence of lactone as additive as the amount of catalyst also depends on the type of solvent used to some extent.

As surfactant required in the present process, any surfactant which is conventionally used in phenolic foam production may be used as long as it is efficient over the temperature range of 0° to 100° C. Suitable surfactants which may be employed in the process of the present invention include silicone/ethyleneoxide/-propyleneoxide copolymers, alkoxy silanes, polysilyl-phosphonates, polydimethyl/siloxane and polydimethylsiloxanepolyoxyalkylene copolymers and any other surfactant known to those skilled in the art to be useful in the preparation of phenolic foam resins. Preferred surfactants are polydimethysiloxane-polyoxyalkylene block copolymers such as that available from Dow Corning Corporation under the trade mark DC-193 and an ethoxylated castor oil sold under the trade mark REXOL by G.A.F. Corporation.

The amount of surfactant used is not critical except insofar as a minimum proportion is concerned. That minimum proportion is 2 phr of any kind of surfactant. Above that, the amounts are not critical but can range up to about 10 phr with about 3 to 5 phr being preferred.

Various types of blowing agents can be used in the process according to the invention as long as they are of low thermal conductivity and of course low boiling point. Some examples are polyhalogenated saturated fluorocarbons, the halogenated hydrocarbons, particularly fluorocarbons, hydrocarbons or mixtures thereof which have atmospheric pressure boiling point of about −40° C. to about 93° C. Some examples are chlorinated and fluorinated hydrocarbons such as chloroform, methylene/chloride, trichlorofluoromethane, tetrafluoromethane, 1,1,2-trichloro-1,2,2-trifluoroethane, monochlorodifluoromethane, dichlorodifluoromethane, 1,1-dichloro-1,2,2,2-tetrafluoroethane, 1,2-dichloro-1,1,2,2-tetrafluoroethane, 1,1,1-trichloro-2,2,2-trifluoroethane, 1,2-difluoroethane, bromotrifluoromethane, 1,1,2,2-tetrachloro-1,2-difluoroethane, 1,1,1,2-tetrachloro-2,2-difluoroethane or mixtures thereof. However, the preferred polyhalogenated fluorocarbons are those sold under the trade mark FREON by E. I. DuPont DuNemours & Co. and in particular FREON 11 and FREON 113 which are trichlorofluoromethane and 1,1,2-trichloro-1,2,2-trifluoroethane respectively. The amount of blowing agent used according to the present invention is not critical and may vary from about 10 to about 30 phr, preferably 10–20 phr.

The order of addition of the reactants for the foaming and polymerization is not critical so long as the resulting mixture is homogenous. A high shear mechanical mixer is preferred. The resin, surfactant and blowing agent can be mixed and then the catalyst added, the lactone being added with resin or catalyst. After foaming has occurred the mixture is cured preferably by heating to about 60° to 100° C. When the catalyst is mixed with the other ingredients, the mixture begins to cream and the cream period wherein nucleation occurs is the beginning of foaming. When butyrolactone is present as an additive in the composition it has been found that the total processing time for obtaining optimal properties particularly K value, of the product can be of the order of about 3 minutes, in other words a very fast rise and curing profile is possible together with very superior foam properties.

The mixing and foaming operations can occur at ambient temperatures which should be within the range of about 15° C. to about 40° C. In order for the resin to quickly attain sufficient strength or full strength to hold the foam it is preferred to cure the foam for approximately 1–10 minutes at 60° to 100° C., preferably about 2 minutes.

IN THE DRAWINGS

EXAMPLE 1

Figure 1:
FIG. 1 is a photomicrograph of an open cell foam, magnification 40x showing microvoids in the cell walls.
Figure 2:
FIG. 2 is a photomicrograph of a closed cell foam, magnification 40x but wherein microvoids are present in the cell walls.
Figure 3:
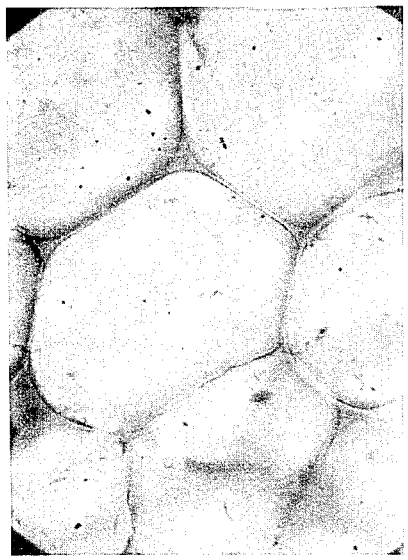
FIG. 3 shows a closed cell foam, magnification 40x, prepared according to the present invention wherein the cell walls are free of microvoids and splits.

To a foamable resole resin (ES-31-B-2 made by Reichold Canada Ltd. for Building Products of Canada Limited) having a viscosity of 25,000 cps, phenol/formaldehyde ratio of 1:1.6 and water content of 9% at a rate of addition of 6.0 kg/min in a semi-continuous operation was added 7 phr (parts per hundred resin) of butyrolactone. Then 5 phr Rexol* surfactant and 13 phr FREON* 11 blowing agent were added to the resin and butyrolactone in a high shear, screw-type industrial mixer (Canadian Pat. No. 1,086,016, U.S. Pat. No. 4,032,115) and 17 phr of ULTRA-TX* (toluene/xylene sulfonic acids): dimethylsulfoxide in a 80:20 ratio added and the whole mixed. The mixture was poured into a travelling mold consisting of two paper facings in a metal frame and cured at 150°–170° F. for about 2 minutes, the total processing time being approximately 3 minutes. The closed cell content of the foamed product was found to be 83% and the gel time 35 seconds. The K value was determined using a heat flow water thermal conductivity test apparatus sold as K-Matic* by Dynatech R & D Company, after 6 days at 100° C. and after 28 days at 100° C. The values were found to be 0.120 and 0.122 Btu-in/°F.-Lr-ft$^2$ respectively.

EXAMPLES 2-10

The procedure of Example 1 was repeated using the proportions of ingredients shown in Table I and the results are shown in Table I.

COMPARATIVE EXAMPLES A-K

The process of example 1 was repeated without the addition of any lactone. The proportions of ingredients and results are shown in Table II. Although these closed cell foams did not show voids or pinholes in the cell walls, wall strength as indicatedd by K values was clearly very significantly lower than when lactone was present.

EXAMPLES 11-15

The procedure of Example I was repeated except that the resin used had a water-content of 10% and viscosity of 23,000 cps. and the proportions of other ingredients were varied. The catalyst was xylene sulfonic acid rather than the mixture of toluene/xylene sulfonic acids. The K-value was determined after 6 weeks at 25° C. The data and results are given in Table III.

ing a mixture of a foamable phenol-aldehyde resin, a blowing agent, and an acid catalyst, allowing the mixture to foam, and curing the phenolic foam, wherein the improvement comprises:

(a) maintaining the water content of the foamable mixture below about 14% by weight, (b) using a resin-soluble acid catalyst, (c) adding at least a minimum amount of two parts per hundred resin of surfactant to the mixture prior to foaming, and (d) adding a member selected from the group consisting of butyrolactone, 5-valerolactone and bromobutyrolactone to the mixture prior to foaming.

2. The improved process of claim 1 wherein the lactone is butyrolactone.

3. The improved process as claimed in claim 1 wherein the improvement further comprises that the solvent is a mixture of butyrolactone and other solvent.

4. The improved process of claim 1 wherein the improvement further comprises that butyrolactone is added to the resin just prior to foaming.

5. The improved process of claim 1 wherein the improvement further comprises that the butyrolactone is

TABLE I

| Example | Butyro-lactone (phr) | Catalyst (phr) | Blowing Agent (phr) | Sur-factant (phr) | Gel Time (sec) | Closed Cell Content (%) | $K_6$ days at 100° C. (Btu-in/°F.-hr-ft$^2$) | $K_{28}$ days at 100° C. |
|---|---|---|---|---|---|---|---|---|
| 1 | 7 | 17 | 13 | 5 | 35 | 83 | .120 | .122 |
| 2 | 7 | 17 | 13 | 5 | 50 | 83 | .120 | .133 |
| 3 | 7 | 13 | 17 | 5 | 60 | 84 | .126 | .148 |
| 4 | 7 | 13 | 13 | 5 | 55 | 79 | .127 | .142 |
| 5 | 7 | 15 | 15 | 4 | 62 | 87 | .123 | .142 |
| 6 | 7 | 15 | 15 | 4 | 82 | 81 | .115 | .133 |
| 7 | 7 | 15 | 15 | 4 | 62 | 85 | .129 | .149 |
| 8 | 7 | 15 | 15 | 4 | 62 | 84 | .129 | .155 |
| 9 | 7 | 15 | 15 | 4 | 62 | 83 | .128 | .126 |
| 10 | 7 | 15 | 15 | 4 | 62 | 84 | .118 | .126 |
| | | | | | | | .124 | .138 |

TABLE II

| Comparative Example | Butyro-lactone (phr) | Catalyst (phr) | Blowing Agent (phr) | Sur-factant (phr) | Gel Time (sec) | Closed Cell Content (%) | $K_6$ days at 100° C. (Btu-in/°F.-hr-ft$^2$) | $K_{28}$ days at 100° C. |
|---|---|---|---|---|---|---|---|---|
| A | 0 | 12 | 14.8 | 5 | 45 | 83 | .123 | .153 |
| B | 0 | 12 | 14.8 | 5 | 50 | 83 | .127 | .170 |
| C | 0 | 12 | 14.8 | 5 | 38 | 83 | .148 | .162 |
| D | 0 | 10 | 14.8 | 5 | 70 | 83 | .124 | .154 |
| E | 0 | 12.8 | 11.0 | 4 | 62 | 86 | .135 | .177 |
| F | 0 | 12.8 | 11.0 | 4 | 49 | 83 | .131 | .175 |
| G | 0 | 12.8 | 11.0 | 4 | 57 | 86 | .124 | .175 |
| H | 0 | 12.8 | 11.0 | 4 | 50 | 88 | .129 | .154 |
| I | 0 | 12.8 | 11.0 | 4 | 55 | 83 | .134 | .177 |
| J | 0 | 12.8 | 11.0 | 4 | 70 | 85 | .148 | .184 |
| K | 0 | 12.8 | 11.0 | 4 | 42 | 83 | .137 | .185 |
| | | | | | | | .133 | .170 |

TABLE III

| Example | Butyro-lactone (phr) | Catalyst (phr) | Blowing Agent (phr) | Sur-factant (phr) | Gel Time (sec) | Closed Cell Content (%) | $K_6$ weeks at 25° C. (Btu-in/°F.-hr-ft$^2$) |
|---|---|---|---|---|---|---|---|
| 11 | 4 | 16 | 14 | 6 | 30 | 82 | .132 |
| 12 | 3.4 | 13.6 | 14 | 6 | 49 | 88 | .129 |
| 13 | 3.4 | 13.6 | 14 | 6 | 47 | 86 | .133 |
| 14 | 3.3 | 13.2 | 14 | 6 | 52 | 83 | .133 |
| 15 | 3.3 | 13.2 | 14 | 6 | 52 | 87 | .129 |

The embodiments of the invention in which an exclusive property or privilege is claimed are defined as follows:

1. An improved process for the preparation of a cured substantially closed cell phenolic resin foam by preparing added to the catalyst.

6. The improved process as claimed in claim 1 wherein the improvement additionally comprises that the amount of butryolactone is 1–10 parts per hundred resin.

7. The improved process as claimed in claim 3 wherein the improvement additionally comprises that the other solvent is a polyhydroxy compound.

8. The improved process as claimed in claim 7 wherein the improvement further comprises that the other solvent is ethylene glycol.

9. The improved process of claim 1 wherein the improvement further comprises that the catalyst is an aromatic sulphonic acid.

10. The improved process of claim 9 wherein the improvement further comprises that the catalyst is toluene or xylene sulphonic acid or a mixture thereof.

11. The improved process of claim 10 wherein the improvement further comprises that the catalyst is dissolved in ethylene glycol.

12. The improved process of claim 10 wherein the improvement further comprises that the catalyst is dissolved in dimethyl sulfoxide.

13. The improved process of claim 9 wherein the improvement further comprises that the catalyst is used in an amount of 3–30 parts per hundred resin.

14. The improved process of claim 1 wherein the improvement further comprises that the surfactant is of the group of silicone/ethyleneoxide/propyleneoxide copolymers, alkoxy silanes, polysilylphosphonates, polydimethylsiloxane and polydimethylsiloxane-polyoxyalkylene copolymers.

15. The improved process of claim 1 wherein the improvement further comprises that the surfactant is a polydimethylsiloxane-polyoxyalkylene block copolymer or an ethoxylated castor oil.

16. The improvement as claimed in claim 1 further comprising that the amount of surfactant is within the range of 2–10 parts per hundred resin.

17. The improvement as claimed in claim 1 wherein the blowing agent is of the group of polyhalogenated saturated fluorocarbons, halogenated hydrocarbons, hydrocarbons or mixtures thereof having an atmospheric pressure boiling point of about $-40°$ C. to about $93°$ C.

18. The improved process as claimed in claim 17 wherein the improvement further comprises that the blowing agent is 1,1,2-trichloro-1,2,2-trifluoroethane or trichlorofluoromethane.

19. The improved process of claim 17 wherein the improvement further comprises that the amount of blowing agent used is from 10 to about 30 parts per hundred of resin.

20. The process of claim 1 wherein the improvement further comprises that the curing of the foamed resin is carried out for 1 to 10 minutes at $60°$ to $100°$ C.

* * * * *